July 9, 1940.  B. E. SHAW  2,207,521
CONTROL SWITCH FOR REFRIGERATION SYSTEMS
Filed Nov. 28, 1938  2 Sheets-Sheet 1
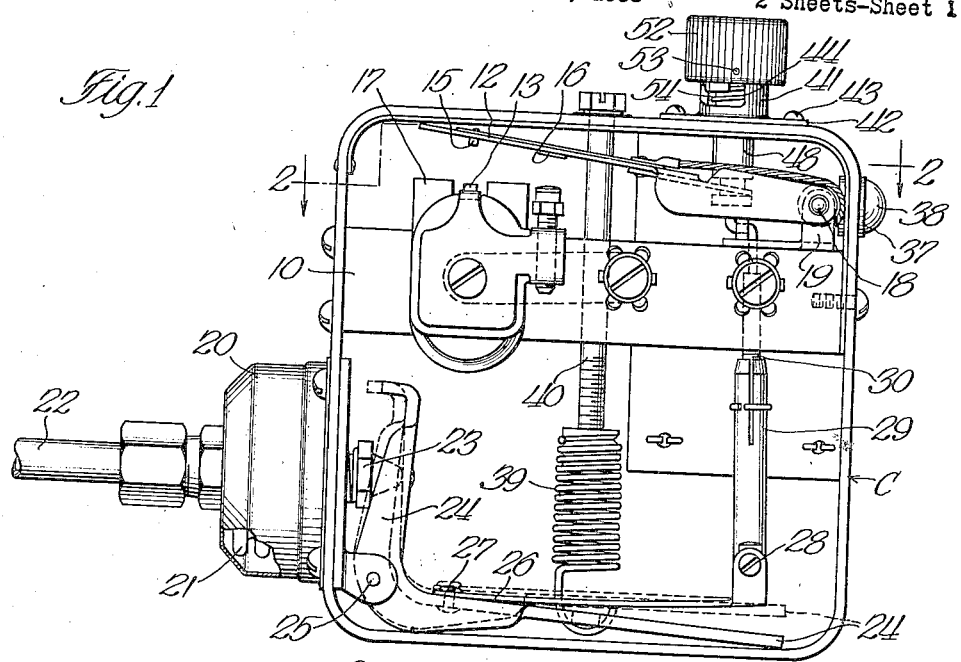
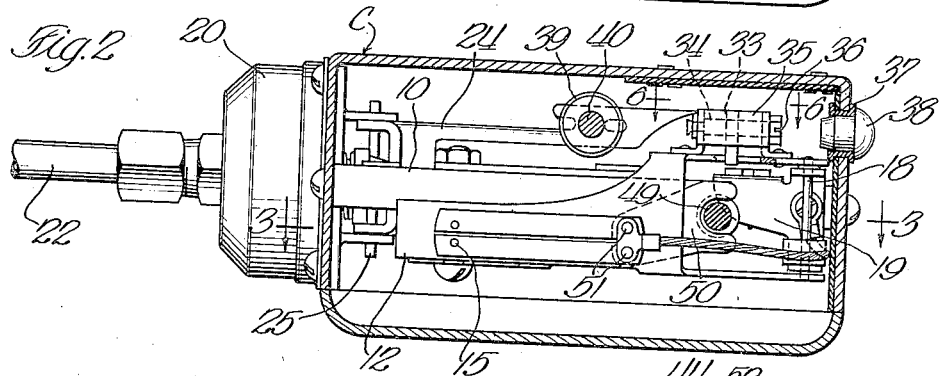
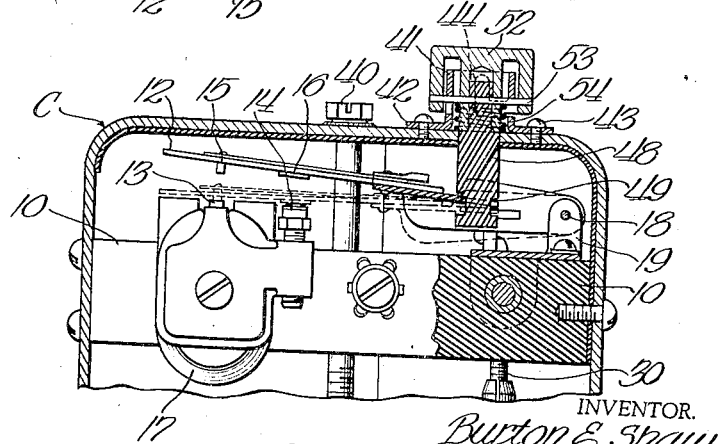
INVENTOR.
Burton E. Shaw
BY Bair & Freeman
ATTORNEYS July 9, 1940.   B. E. SHAW   2,207,521
CONTROL SWITCH FOR REFRIGERATION SYSTEMS
Filed Nov. 28, 1938   2 Sheets-Sheet 2
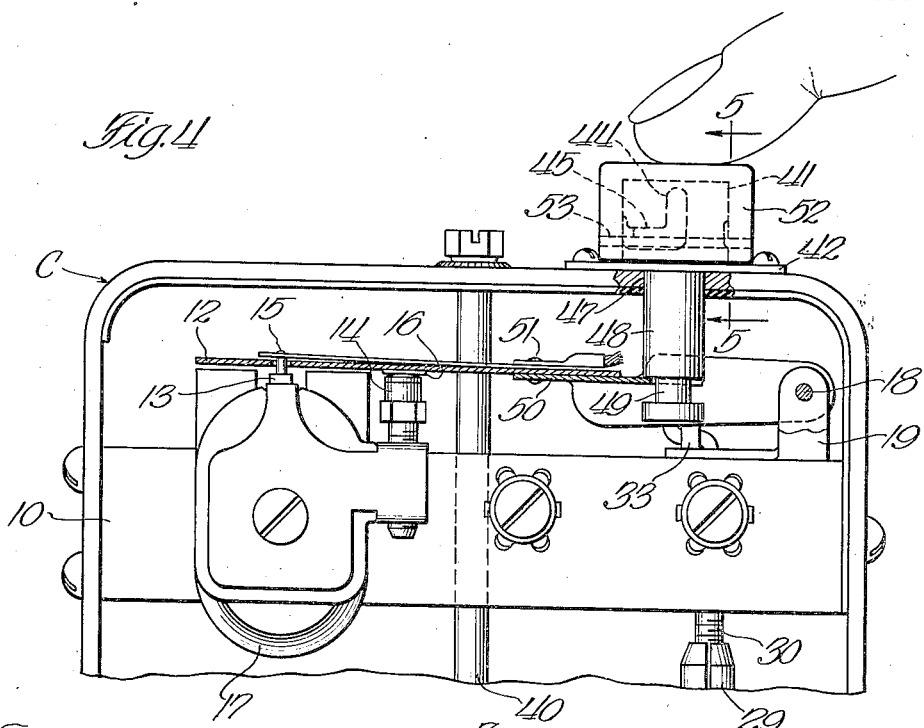
INVENTOR.
Burton E. Shaw
BY Bair & Freeman
ATTORNEYS Patented July 9, 1940

2,207,521

UNITED STATES PATENT OFFICE 2,207,521

CONTROL SWITCH FOR REFRIGERATION SYSTEMS

Burton E. Shaw, Bristol, Ind., assignor to Penn Electric Switch Co., Goshen, Ind., a corporation of Iowa Application November 28, 1938, Serial No. 242,727

5 Claims. (Cl. 200—83)

An object of my present invention is to provide a control switch for refrigeration systems particularly adaptable for controlling a refrigerant compressor used in connection with a refrigerated compartment for cooling milk or other commodities.

Another object is to provide a controller of simple and inexpensive construction having a variety of possible adjustments whereby different desired results in connection with commodity coolers may be secured.

More particularly, it is an object of my invention to provide a controller having a given differential of operation during normal cycling thereof, with auxiliary control devices operable to manually re-position the parts to take care of contingencies encountered during the operation of the cooler.

Another object is to provide a control switch with means to manually move it from cutout to cutin position when milk or other commodities are placed in the space being refrigerated, so that the usual rise in temperature because of introduction of the commodity into the space is eliminated and instead, the temperature is pulled down again to the minimum setting of the controller after which normal automatic cycles of operation of the refrigeration system may be resumed and continue.

Another object is to provide a manually operable control knob for this purpose which is also designed with the aid of a very few additional parts so that the knob can assume a position for normal operation or two other positions, one by mere depression for causing a cutin operation of the switch, after which normal operations in response automatically to the controller are continued, and the other for turning the refrigerator off by a simple manipulation of the same knob.

Still another object is to provide a differential adjuster in connection with my control switch which is readily operable from the exterior of the control housing and effects micrometric adjustment of a switch arm in the controller with relation to the temperature or pressure operated means which effects automatic control of the switch arm.

Other objects, purposes and characteristic features of the present invention will be in part obvious from the accompanying drawings and in part pointed out as the description of the invention progresses. In describing the invention in detail, reference will be made to the accompanying drawings, in which like reference characters designate corresponding parts throughout the several views, and in which Figure 1 is a front elevation of a control switch embodying my invention with the auxiliary control knob in off position and a front cover plate for the casing omitted;

Figure 2 is a sectional view on the line 2—2 of Figure 1 showing a plan view of the apparatus within the casing of the control switch;

Figure 3 is a sectional view on the line 3—3 of Figure 2 showing the auxiliary control knob in normal position;

Figure 4 is an enlarged view similar to Figure 3 showing the auxiliary control knob pressed down for closing the switch;

Figure 5 is a further enlarged sectional view on the line 5—5 of Figure 4, showing the coaction between the control knob and a means for mounting it;

Figure 6 is an enlarged sectional view on the line 6—6 of Figure 2, showing details of a differential adjusting mechanism;

Figure 7 is a sectional view on the line 7—7 of Figure 6 showing further details thereof, and Figure 8 is a graph showing the operation of my control switch.

On the accompanying drawings I have used the reference character C to indicate generally a casing. Within the casing C a supporting bar 10 is provided for a switch arm 12 and contacts 13 and 14. The contacts 13 and 14 are adapted to coact with contacts 15 and 16 of the switch arm 12. The switch arm 12 constitutes an armature which coacts with a permanent magnet 17 to secure snap action of the switch. The switch arm 12 is pivoted on a pin 18 supported by a bracket 19 which in turn is supported by the bar 10.

Secured to the casing C is a bellows housing 20. Within the housing 20 a bellows 21 is provided which is subject to pressure surrounding it within the housing. Such pressure is introduced through a tube 22 which is usually connected to the low side of the refrigerant pipe line so that the bellows 21 is responsive to the pressure of refrigerant therein. Connected with the bellows 21 is an actuating pin 23 cooperating with a control arm 24 pivoted at 25.

The control arm 24 has a leaf spring 26 riveted thereto at 27. The leaf spring carries a pivot screw 28 connected by link elements 29 and 30 with the switch arm 12 by the following described mechanism.

The link element 30, as shown in Figures 6 and 7, has a pivot portion 31 located in a hole 32 formed in a plate 33. The plate 33 screw-threadedly receives a differential adjusting screw 34. the plate is provided with a lug 36b slidable in a slot 33a to prevent rotation of the plate. The screw 34 is rotatable and non-slidable relative to a bracket 35 which in turn is supported on the switch arm 12.

The link elements 29 and 30 are screw-threadedly associated with each other whereby the effective length of the link may be adjusted as desired. Adjustment of the differential adjusting screw 34 is secured by rotating it with a screwdriver inserted in a slot 36 thereof. The screwdriver may be manipulated from the exterior of the casing C by thrusting it through an insulation bushing 37 (see Figure 2) after a rubber plug 38 has been removed therefrom.

The range of operation of the switch structure is adjusted in the usual manner by a range spring 39 and an adjusting screw 40 therefor.

My auxiliary control means consists of the following described parts: A sleeve 41 is provided with a flange 42 secured to the casing C as by screws 43. The sleeve 41 has a bayonet slot (best shown in Figure 5) having parts indicated at 44, 45 and 46. Slidable in an opening 47 of the casing C is a pin 48. The pin 48 has an annular groove 49 loosely received in a bifurcated plate 50 which is secured to the switch arm 12 by rivets 51.

Pinned to the pin 48 is a knob 52. A pin 53 is provided for the purpose of fastening the two elements 48 and 52 together. The pin 53 extends through the bayonet slot 44—45—46. A spring 54 is interposed between the bottom of the pin 53 and the top of the casing C. The spring 54 is so related to the leaf spring 26 that the tension of the spring 54 is great enough to overcome the tension of the spring 26 when the parts are in the solid line position illustrated in Figure 1.

*Practical operation*

In the operation of my control switch herein disclosed, the knob 52 may be rotated counterclockwise from the position shown in Figures 3 and 5 so that the pin 53 leaves the portion 46 of the bayonet slot, traverses the portion 45 and enters the portion 44. Thereupon the knob 52 will be raised by the spring 54 to the position shown in Figure 1 when the operator releases the knob. The knob is now in position for keeping the switch in the off position because of the spring 54 being stronger than the spring 26. The pressure in the low side of the refrigerant system may vary so as to move the lever 24 between the full and dotted line positions of Figure 1 without closing the switch; as in the full line position, the spring 26 will be merely bent upwardly as illustrated.

The normal differential of operation of the switch of course may be of any desired spread within the possibilities of adjustment of the screw 34. By way of example, the differential has been illustrated as 2°, in Figure 8. The range of course may also vary depending on the adjustment of the tension of the spring 39. Again in Figure 8 it has been illustrated as between 32° and 34°.

When the knob 52 is adjusted to the position shown in Figures 3 and 5, the pin 53 in the portion 46 of the bayonet slot is retained in position by the spring 54. This places the groove 49 at such position that the switch arm 12 may move between its cutin and cutout limits shown by dotted and solid lines respectively in Figure 3, without interference by the pin 48.

With such a setting, when a commodity such as milk is placed in the space being refrigerated, the temperature may be going up from a first cutout point toward a second cutin point, indicated at $CO^1$ and $CI^1$ in Figure 8. The commodity was placed in the refrigerated space at point $CI^2$, whereupon the temperature started rising more rapidly, as indicated by the dotted line from $CI^2$ to $CI^1$. Finally the switch would cut in at $CI^1$ and there would then be a long pull-down period from $CI^1$ to $CO^2$ before cutout of the switch would occur.

With my auxiliary control knob 52, however, it is possible when placing the commodity in the refrigerated space at point $CI^2$ to merely press down on the knob 52, which will move the switch arm 12 from its solid position of Figure 3 to its dotted position, thus closing the switch. Thereupon the switch will remain closed until the temperature has been brought down and cutout occurs at point $CO^3$. Thereafter, normal cycles of operation will occur, with the temperature rising to $CI^3$, cutin occurring, the temperature lowering to $CO^4$, cutout occurring, and so on.

The manual actuation of the switch as just described is possible because of the differential of operation of the switch. After a cutout operation of the switch and the temperature starts rising, the switch will not cut in again normally until the cutin line at 34°. However, the control arm 24 has moved toward cutin position, so that if the switch is manually moved to cutin position the magnet 17 will retain it in that position until the temperature lowers sufficiently for the arm 24 to move the switch arm back to cutout position. Therefore the desired operation as indicated by the solid line in Figure 8 can be secured, whereas an undesirable rise in temperature and an equally undesirable long pull-down period occur when a warm commodity is put into the space being refrigerated. Thus I have provided, by the use of the single control knob 52, a means to keep the control switch set for normal automatic operation, or open the switch manually so that it stays in open position, or close it manually in such manner that after the temperature is pulled down to the normal cutout position normal operations are resumed and thereafter continue.

Having described one specific embodiment of my control switch and the operation thereof, it is desired to be understood that this form is selected to facilitate the disclosure of the invention rather than to limit the number of forms which it may assume, and it is to be understood further that the various modifications, adaptations and alterations may be applied to the specific form disclosed to meet the requirements of practice without in any manner departing from the spirit and scope of the present invention, except as limited by the claims appended hereto.

I claim as my invention:

1. In a control switch structure, switch mechanism, condition responsive means to normally move said switch mechanism to cutout and cutin positions between predetermined limits, and auxiliary control means for said switch mechanism comprising a manually operable knob normally extended and operatively coactable with said switch mechanism to move it from cutout to cutin position by depression of said knob whereupon after a succeeding cutout operation, the switch mechanism responds in the normal manner to the condition responsive means, said knob being movable to a position for positively retaining said switch mechanism in cutout position, a knob spring for moving it to such position, a spring connection between said switch mechanism and said condition responsive means which is overcome by said knob spring, and a bayonet and pin means for locking said knob in position to permit normal operation of said switch mechanism.

2. In a control switch structure, switch mechanism, condition responsive means to move said switch mechanism to cutout and cutin positions, and auxiliary control means for said switch mechanism comprising a manually operable element movable from a first position to a second position operatively coacting with said switch mechanism to move it from one of its positions to the other, said element, upon release, returning to said first position whereupon after a succeeding operation by said condition responsive means to its opposite position, the switch mechanism responds in the normal manner to the condition responsive means, said element being movable to a third position for positively retaining said switch mechanism in cutout position.

3. In a control switch structure, switch mechanism, condition responsive means to move said switch mechanism to cutout and cutin positions, auxiliary control means for said switch mechanism comprising a manually operable element operatively coactable with said switch mechanism to move it from one of its positions to the other by operation of said element whereupon after a succeeding operation by said condition responsive means to its opposite position, the switch mechanism responds in the normal manner to the condition responsive means, said element being movable to a position for positively retaining said switch mechanism in cutout position, a spring for moving said element to such position and a spring connection between said switch mechanism and said condition responsive means which is overcome by said element spring.

4. In a control switch structure, switch mechanism, condition responsive means to move said switch mechanism to cutout and cutin positions between predetermined limits, and auxiliary control means for said switch mechanism comprising a manually operable element operatively coactable with said switch mechanism to move it from cutout to cutin position whereupon after a succeeding cutout operation the switch mechanism responds in the normal manner to the condition responsive means, said element being movable to a position for positively retaining said switch mechanism in cutout position, a spring for moving it to such position, a spring connection between said switch mechanism and said condition responsive means which is overcome by said first spring, and a bayonet and pin means for locking said element in position to permit normal operation of said switch mechanism.

5. In a control switch structure, switch mechanism, condition responsive means to move said switch mechanism to cutout and cutin positions between predetermined limits, and auxiliary control means for said switch mechanism comprising a manually operable element operatively coactable with said switch mechanism to move it from one of its positions to the other by operation of said element whereupon after a succeeding operation by said condition responsive means to its opposite position, the switch mechanism responds in the normal manner to the condition responsive means, said element being movable to a position for positively retaining said switch mechanism in cutout position, a spring for moving it to such position, a spring connection between said switch mechanism and said condition responsve means which is overcome by said first spring, and a bayonet and pin means for locking said element in position to permit normal operation of said switch mechanism.

BURTON E. SHAW.